United States Patent Office 3,228,761
Patented Jan. 11, 1966

3,228,761
METHOD OF FINE ANNEALING TRANSPARENT VITREOUS SILICA
Kenneth Henderson Jack, Cullercoats, North Shields, and John Alexander Winterburn, Tynemouth, North Shields, England, assignors to The Thermal Syndicate Limited, Northumberland, England, a British company
No Drawing. Filed Aug. 24, 1962, Ser. No. 219,126
10 Claims. (Cl. 65—32)

The present invention relates to an improved method of heat treating vitreous silica, having particular application in regard to transparent vitreous silicas which possess a strong absorption band in the infrared at a wavelength of 2.73 microns. Examples of these grades are transparent vitreous silica having optical densities at this wavelength, of between, 0.3 and 1.5 per mm. Optical density at a given frequency is a useful way of defining the magnitude of an absorption band, since the optical density is directly proportional to the path length in the specimen. By optical density we mean the logarithm to the base 10 of the reciprocal of the transmittance expressed as a decimal, and whereby the transmittance is the percentage of incident light which emerges from the specimen when the reflection losses on entering and emerging from the specimen are discounted.

Much work has been carried out on the annealing processes applicable to ordinary glasses and there are several semi-empirical relationships between variables which are sufficiently accurate when applied to glasses to provide the required results. On the basis of such generalisations, transparent vitreous silica should be the glass most easily annealed, but in practice this is found not to be the case.

The application of schedules currently used to provide fine annealing of homogeneous transparent vitreous silica, not being infrared absorptive, provide unsatisfactory results when employed with the grades of transparent vitreous silica such as the infrared absorptive transparent vitreous silicas previously referred to. The birefringence caused by residual strain remaining in material of these grades after conventional annealing schedules can be reduced to a tolerable level (8 millimicrons/cm.) by using a cooling rate much slower than normal, but even so, an excessive variation of refractive index remains across the block. This change in refractive index has now been found to be caused by loss of constituent water, present as hydroxyl groups, from the surface of the material during the heat treatment, which loss results in a corresponding change in composition varying from the centre to the edge of a block of material. This loss of constituent water is particularly severe in the annealing range. It is a feature of this invention that this change in composition which normally occurs during annealing is reduced thus making possible the production of optical quality infrared absorptive transparent vitreous silicas having low residual strains and much smaller variations in the refractive index across the block than hitherto possible.

According to the present invention a method of annealing a sample of vitreous silica comprises heating the sample in an atmosphere in which the water vapour is maintained substantially in equilibrium with the constituent water content of the sample being annealed.

A measure of the water content of a sample of vitreous silica may be obtained from the intensity of the absorption band at a wavelength of 2.73 microns. Thus to anneal a sample of vitreous silica in accordance with the invention having no detectable absorption band at a wavelength of 2.73 microns, the sample should be heated in an atmosphere free from water vapour or from compounds which at the annealing temperature would dissociate or combine to form water vapour.

Where the sample of vitreous silica to be annealed has an absorption band at a wavelength of 2.73 microns, the annealing should be carried out in an atmoshpere in which the partial pressure of water vapour is in equilibrium with the constituent water content of the sample. A number of different methods may be employed to obtain the desired partial pressure of water vapour in the atmosphere surrounding the sample. For example blocks of vitreous silica to be annealed may be loaded into a gas tight container, which is subsequently evacuated to a pressure not greater than 1 mm. of mercury and then sealed. The container is then placed in a furnace and the desired annealing schedule carried out. Preferably the container should be as tightly packed as possible with material to be annealed so that the partial pressure of water vapour of the gas remaining inside the container more rapidly comes to equilibrium with the constituent water of the blocks. The establishment of the required equilibrium conditions within the container may be assisted by filling the spaces remaining after packing the blocks into the container with fine particles of vitreous silica having the same constituent water content as the blocks. The container should remain impermeable to gases and vapours throughout the annealing schedule.

Alternatively the sample may be placed in a chamber through which is passed a slow stream of a gas which is inert to vitreous silica. The partial pressure of water vapour in the gas stream is controlled by passing the gas through a water container prior to its passage through the chamber to produce the desired partial pressure of water vapour in the atmosphere surrounding the sample during the annealing schedule. The gas stream may be passed, at least in part, either through or over the water in the container. In place of pure water there can be employed suitable aqueous solutions, salt hydrates or compounds which react or decompose to form water. The container may be heated independently of said chamber so that control can be exercised over the partial pressure of water vapour in the gas stream fed to the chamber. It will be realised that the equilibrium conditions vary with temperature, so that to maintain the water content of the atmosphere in equilibrium with the constituent water of the vitreous silica it is necessary to adjust the partial pressure of water in the gas stream in sympathy with temperature changes of the sample.

A further method involves packing the material to be annealed in a first chamber, connected by a suitable system of pipes to a second chamber. The first chamber is disposed within the annealing furnace so that the material contained therein may be subjected to the desired annealing schedule. The second chamber contains pure water, an aqueous solution, a salt hydrate or compounds which decompose or react to produce water. The temperature of the second chamber may be controlled independently of the temperature of the first, so that during the course of the annealing process the partial pressure of water vapour in the atmosphere in the first chamber may be controlled by varying the temperature of the second.

Where the annealing is performed in a fuel fired furnace there is the additional possibility of annealing the sample in an atmosphere comprising the gaseous products of combustion of the fuel. If the water vapour content of the gaseous products of combustion is too low for equilibrium with the constituent water vapour content of the sample being annealed, additions of water vapour to the fuel and/or the gases supporting combustion can be made prior to combustion.

Two examples of methods of annealing vitreous silica in accordance with the invention will now be given by way of explanation:

*Example 1*

Pieces of vitreous silica having an optical density at a wavelength of 2.73 microns, of 1.2 per mm., were placed in a furnace with a current of steam at atmoshperic pressure passing through the furnace at a rate of 7 litres per minute. The pieces of vitreous silica were rapidly heated to a soaking temperature of 1040° C. Annealing was carried out for 80 hours at this temperature of 1040° C.

With the current of steam continuing to pass at the same rate, the temperature of the furnace was reduced from 1040° C. to 900° C., at a rate of 10° C. per hour, and steam gradually diluted with oxygen to maintain the desired equilibrium conditions during the temperature reduction, until at 900° C. the relevant volume rates of flow steam/oxygen were 5/3.

The pieces of vitreous silica were then removed from the furnace and rapidly cooled to room temperature.

*Example 2*

Proceeding as in Example 1 up to the conclusion of the 80 hours soak at a temperature of 1040° C., the reduction of temperature from 1040° C. to 900° C. was carried out without dilution of the steam.

When the temperature had reached 900° C., the current of steam was diluted with oxygen to the same volume ratio as in Example 1 (namely a steam to oxygen ratio of 5 to 3), and with the diluted current of steam flowing through the furnace the temperature of 900° C. was maintained for 40 hours.

The final rapid cooling to room temperature as employed in Example 1 was also carried out.

Employment of the method according to Example 1 gives more satisfactory results than employment of the method according to Example 2, but the method according to Example 2 is more convenient in operation.

Although in the two foregoing examples a current of pure steam at atmospheric pressure was employed, it will be appreciated that similar results can be obtained while operating the furnace at higher total pressures than 1 atmosphere by the addition of suitable gases such as oxygen, nitrogen and the inert gases, provided the partial pressure of steam is maintained at 1 atmosphere.

By carrying out the annealing of transparent vitreous silica in accordance with the invention it has been found that blocks of infrared absorptive transparent vitreous silica can be annealed, so that for example with a cubic block having an edge dimension of 7.5 cm. a residual birefringence of 5 millimicrons/cm. can be obtained under the aforementioned conditions and the refractive index change across the blocks reduced to $1 \times 10^{-5}$ per 2.5 cm.

Although the disclosure so far has been confined to considering the annealing of transparent vitreous silica with a substantially uniform constituent water content, clearly the invention includes a method whereby a non-uniform distribution of constituent water may be rendered more uniform. In this case the desired heat treatment is carried out in an atmosphere in which the partial pressure of the water vapour is maintained at a level corresponding to the desired ultimate uniform constituent water content. In view of the low rate of diffusion of constituent water through vitreous silica such an operation normally takes many hours.

What we claim is:

1. In a process of annealing vitreous silica, the method of controlling the uniformity of the refractive index of a body of vitreous silica, comprising the steps of determining the water content of said body of vitreous silica; subjecting said body of vitreous silica in a confined space to heating at annealing temperature and thereafter to cooling to a substantially lower temperature; and simultaneously controlling the partial water vapor pressure of the ambient atmosphere in said confined space so that said water vapor pressure is substantially in equilibrium with said determined water content of said body of vitreous silica.

2. In a process of annealing vitreous silica, the method of controlling the uniformity of the refractive index of a body of vitreous silica, comprising the steps of subjecting said body of vitreous silica having no detectable absorption band at a wave length of 2.73 microns and thus being substantially water free in a confined space to annealing by heating to an elevated temperature range of between 900° C. and 1040° C. and thereafter cooling to a substantially lower temperature, while maintaining in said confined space a substantially water vapor-free atmosphere.

3. In a process of annealing vitreous silica, the method of controlling the uniformity of the refractive index of a body of vitreous silica, comprising the steps of subjecting said body of vitreous silica having an optical density at a wave length of 2.73 microns of between about 1.2 and 1.5 per millimeter in a confined space to annealing by heating to an elevated temperature range of between 900° C. and 1040° C. and thereafter cooling to a substantially lower temperature while maintaining in said confined space an atmosphere consisting substantially of pure steam at atmospheric pressure so that the water vapor pressure of said atmosphere is in substantial equilibrium with the water content of said body of vitreous silica as determined by said optical density thereof.

4. In a process of annealing vitreous silica, the method of controlling the uniformity of the refractive index of a body of vitreous silica, comprising the steps of determining the water content of said body of vitreous silica; subjecting said body of vitreous silica to annealing by heating to an elevated temperature range of between 900° C. and 1040° C. and thereafter to cooling to a substantially lower temperature; and simultaneously controlling the water vapor content of the atmosphere surrounding said body of vitreous silica so that the partial water vapor pressure of said surrounding atmoshpere is substantially in equilibrium with said determined water content of said body of vitreous silica being annealed.

5. In a process of annealing vitreous silica, the method of controlling the uniformity of the refractive index of a body of vitreous silica, comprising the steps of determining the water content of said body of vitreous silica; subjecting said body of vitreous silica in a confined space to annealing by heating to an elevated temperature range of between 900° C. and 1040° C. and thereafter to cooling to a substantially lower temperature; and simultaneously passing through said confined space a stream of gas having a partial water vapor pressure substantially in equilibrium with said determined water content of said body of vitreous silica being annealed.

6. A method of annealing vitreous silica according to claim 5 wherein a stream of gas is passed through a container containing a water vapor evolving material, so as to incorporate in the stream of gas water vapors at a partial pressure substantially in equilibrium with said determined water content of said body of vitreous silica, prior to passing said stream of gas through said confined space.

7. A method of annealing vitreous silica according to claim 5, wherein said container and said confined space in which said body of vitreous silica is subjected to annealing are heated independently of each other.

8. In a process of annealing vitreous silica, the method of controlling the uniformity of the refractive index of a body of vitreous silica, comprising the steps of introducing at least one body of vitreous silica into a gas-tight annealing chamber so as to fill at least the major portion of the interior of said annealing chamber with vitreous silica; evacuating the thus filled annealing chamber; and subjecting said body of vitreous silica in said evacuated annealing chamber to annealing by heating to an elevated temperature range of between 900° C. and 1040° C. and thereafter to cooling to a substantially lower temperature.

9. In a process of annealing vitreous silica, the method of controlling the uniformity of the refractive index of a body of vitreous silica, comprising the steps of determining the water content of said body of vitreous silica introducing at least one body of vitreous silica having said determined water content into a gas-tight annealing chamber; substantially filling the remaining space in said annealing chamber with fine particles of vitreous silica having a water content equal to said determined water content of said body of vitreous silica; evacuating the thus filled annealing chamber; and subjecting said body of vitreous silica in said evacuated annealing chamber to annealing by heating to an elevated temperature range of between 900° C. and 1040° C. and thereafter to cooling to a substantially lower temperature.

10. A method of annealing vitreous silica according to claim 1, wherein at least one body of vitreous silica which is to be annealed is packed into a first gas-tight chamber; water vapors are produced in a second chamber communicating with said first chamber; and wherein the temperature of said first and second chambers are controlled independently of each other.

References Cited by the Examiner
UNITED STATES PATENTS

| 176,066 | 4/1876 | Rogers | 65—117 |
|---|---|---|---|
| 2,433,928 | 1/1948 | Sheldon | 65—117 X |

OTHER REFERENCES

The Proceedings of the Physical Society, vol. 54, part 5, Sept. 1, 1942, No. 305, pages 391 to 404.

DONALL H. SYLVESTER, *Primary Examiner.*